United States Patent [19]

Ikari

[11] Patent Number: 4,612,975
[45] Date of Patent: Sep. 23, 1986

[54] AIR CONDITIONING DEVICE INSTALLED IN A CABIN OF AN EARTH-MOVING VEHICLE

[75] Inventor: Masanori Ikari, Iruma, Japan

[73] Assignee: Kabushiki Kaisha Komatsu Seisakusho, Tokyo, Japan

[21] Appl. No.: 697,843

[22] Filed: Feb. 4, 1985

[30] Foreign Application Priority Data

Feb. 7, 1984 [JP] Japan .................................. 59-15045
Feb. 7, 1984 [JP] Japan .................................. 59-15046

[51] Int. Cl.⁴ ............................................. B60H 1/00
[52] U.S. Cl. ........................................ 165/43; 62/244;
98/2.06; 98/2.11
[58] Field of Search ............... 165/16, 42, 43; 62/239,
62/244; 98/2.06, 2.11

[56] References Cited

U.S. PATENT DOCUMENTS

| | | | |
|---|---|---|---|
| 2,779,164 | 1/1957 | Doane | 98/2.11 X |
| 3,555,846 | 1/1971 | Harbeck et al. | 62/244 |
| 4,072,487 | 2/1978 | Irwin | 62/244 |
| 4,120,527 | 10/1978 | Lawrence | 98/2.11 X |
| 4,344,356 | 8/1982 | Casterton et al. | 165/42 X |
| 4,531,453 | 7/1985 | Warman et al. | 98/2.11 |

FOREIGN PATENT DOCUMENTS 2507080  9/1976  Fed. Rep. of Germany ........ 165/42

Primary Examiner—William E. Tapolcai
Attorney, Agent, or Firm—Frost & Jacobs

[57] ABSTRACT

An air conditioning device installed in a cabin of an earth-moving vehicle is equipped with a housing which has internal and external air intake ports to intake the internal air and the external air, a housing for containing cooling units and heating units, and a housing for mixing the air, that are located at the back of the driver's seat in the cabin, on either one side of the driver's seat, and under the driver's seat, respectively. The air is blown by a blower provided in the housing which intakes the internal air and the external air. The cold air or the hot air which has passed through the cooling units or the heating units is blown from the blow ports provided on the front side of the housing for mixing the air, and from the blow ports provided in the dash board in the cabin.

1 Claim, 4 Drawing Figures

AIR CONDITIONING DEVICE INSTALLED IN A CABIN OF AN EARTH-MOVING VEHICLE

BACKGROUND OF THE INVENTION

1. Field of the Invention

This invention relates to an air conditioning device for cooling and heating the air in a cabin of an earth-moving vehicle such as bulldozer, shovel loader, or the like.

2. Description of the Prior Art

A known device consists, as shown in FIG. 1, of installing an air conditioning device C on the ceiling of a cabin B of an earth-moving vehicle A, connecting the air conditioning device C to the engine via conduits D, and blowing hot air or cold air into the cabin to cool or heat the air in the cabin B.

With the device being constructed as described above, however, the conduits D must be removed when the cabin B is to be removed from the car body. Namely, to remove the cabin involves cumbersome operation. Further, when a filter for introducing the external air is to be cleaned, the operator must detach or attach the filter by climbing the ceiling of the cabin; i.e., cumbersome operation is required for detaching and attaching the filter when it is intended to clean the filter. Cumbersome operation is further required for the servicing and maintenance of the air conditioning device. Moreover, strong vibration is produced via the cabin B. Furthermore, the air conditioning device must be strongly constructed so as not to be damaged even in case rocks or the like fall thereon. Because of these reasons, the air conditioning device becomes costly.

Further, since the air conditioning device is installed on the ceiling of the cabin, the cold air or the hot air at the time of cooling or heating is blown downwards from the side above the head of the operator. Therefore, the floor side is not efficiently cooled or heated, and the feet of the operator are not effectively cooled or heated. This difficulty appears conspicuously when the feet are to be heated.

It can therefore be contrived to install the air conditioning device C at the back of the operator's seat in the cabin B, or by the side of the operator's seat, or in front of the operator's seat. If installed at the back of the operator's seat, however, the air conditioning device (particularly conduits) must be removed when units (such as transmission and the like) located under the driver's seat are to be removed or adjusted, making the operation cumbersome. If installed by the side of the operator's seat, the air conditioning device hinders the operator from getting in or out of the cabin. If the air conditioning device is installed in front of the operator's seat, space is reduced in front of the operator's seat. Therefore, the operator finds it uneasy to be in the cabin and, further, loses sight in the forward direction.

Further, no matter where the air conditioning device is installed among the above-mentioned places, the air blow port and the internal air intake port are located close to each other, creating the flow of the air only in a local portion in the cabin. Therefore, the cold air or the hot air is readily intaken, making it difficult to efficiently cool or heat the air in the cabin.

SUMMARY OF THE INVENTION

It is an object of the present invention to provide an air conditioning device that is installed in a cabin of an earth-moving vehicle, without hindering accessibility for the maintenance, without deteriorating comfortableness for the operator, and without losing sight in the forward direction.

It is another object of the present invention to provide an air conditioning device for an earth-moving vehicle, which generates a uniform flow of the air in the cabin, and which efficiently conditions the air in the cabin without readily intaking, through the intake port, the cold air or the hot air blown from the blow ports.

In order to achieve the above-mentioned objects, the present invention provides an air conditioning device installed in a cabin of an earth-moving vehicle, comprising cooling means, heating means, and a blower for blowing the internal air and the external air to said cooling means or heating means, the improvement wherein internal air intake ports communicated with the intake side of said blower are formed on both the right and left sides in the cabin at the back of the operator's seat, and blow ports are formed in a dash board placed in front in the cabin to blow the cold air or the hot air supplied from said cooling means or said heating means.

According to the present invention, furthermore, there is provided an air conditioning device installed in a cabin of an earth-moving vehicle, comprising:

a housing for intaking the internal air and the external air, said housing being located at the back of the operator's seat, and being provided with internal air intake ports, external air intake ports, filter devices for the internal air and the external air, and a blower;

a housing which is located by the side of the operator's seat, and which contains cooling means as well as heating means; and a housing for mixing the air, which is located under the driver's seat, and which has blow ports for blowing the cold air or the hot air;

wherein the blow side of said blower is opened in said housing which contains said cooling means and said heating means so as to be communicated with said cooling means and said heating means, and the blow sides of said cooling means and of said heating means are opened in said housing for mixing the air so as to be communicated therewith.

BRIEF DESCRIPTION OF THE DRAWINGS

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE INVENTION

Figure 1:
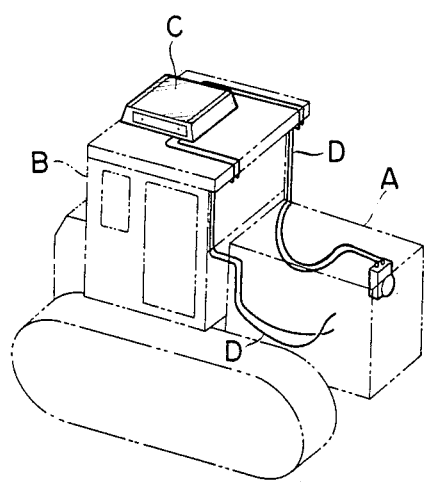
FIG. 1 is a schematic perspective view of a conventional air conditioning device for a cabin of an earth-moving vehicle.
Figure 2:
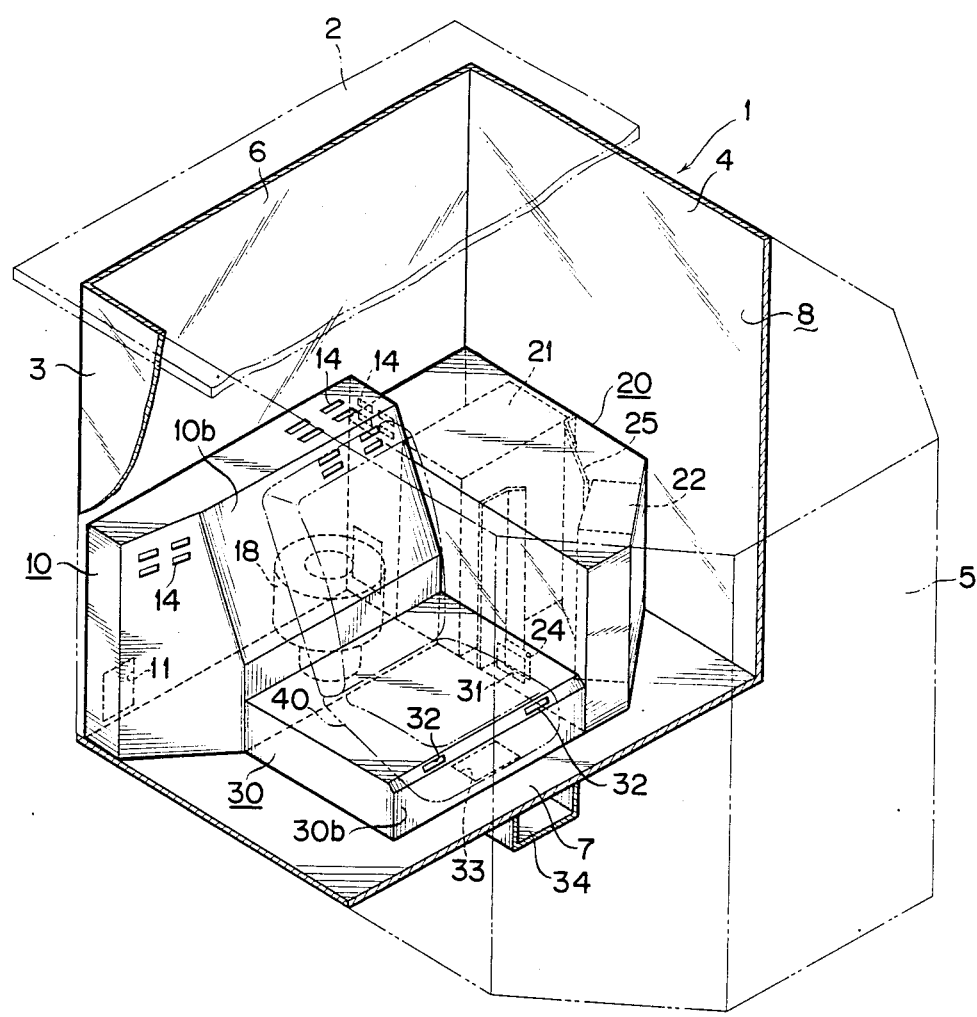
FIG. 2 is a general schematic perspective view showing an embodiment of the present invention.

FIG. 2 is a general schematic perspective view of an air conditioning device installed in a cabin of an earth-moving vehicle according to an embodiment of the present invention, wherein a cabin 1 is constituted in the form of a housing by a ceiling 2, right and left walls 3, 4, front and rear walls 5, 6, and defines space 8 or operator's room on a floor board 7.

The air conditioning device is divided into three portions; i.e., a housing 10 for intaking the internal air and the external air, a housing 20 for containing the cooling means and the heating means, and a housing 30 for mixing the air. The housing 10 for intaking the internal air and the external air is located on a corner between the rear wall 6 of the floor board 7 and the left side wall 3. The housing 20 which contains the cooling means and the heating means is located on the side of the right wall 4 of the floor board 7, and the housing 30 for mixing the air is located on a middle portion of the floor board 7. A driver's seat 40 is mounted on the housing 30 which mixes the air.

Namely, the housing 10 for intaking the internal air and the external air is installed at the back of the operator's seat 40, the housing 20 which contains the cooling means and the heating means is installed by the side of the seat 40, and the housing 30 for mixing the air is installed under the seat 40.

Figure 3:
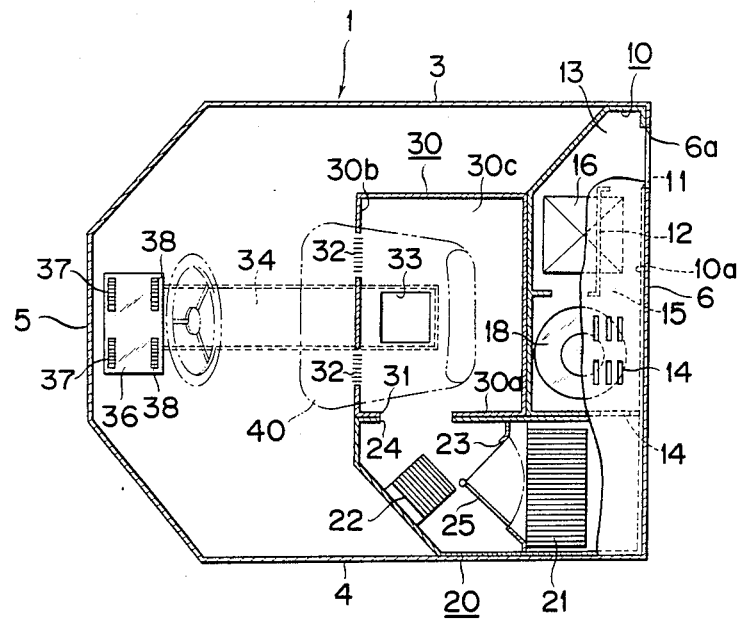
FIG. 3 is a partially cut-away horizontal schematic plan view of the embodiment of the present invention shown in FIG. 2.
Figure 4:
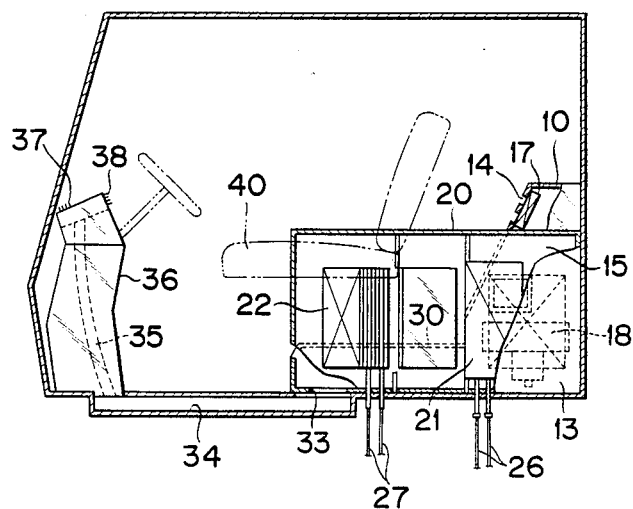
FIG. 4 is a partially cut-away vertical schematic side view of the embodiment of the present invention shown in FIG. 2.

As is shown in further detail in FIGS. 3 and 4, an external air intake port 11 is formed in a rear wall 10a of the housing 10 which intakes the internal air and the external air. The external air intake port 11 is opened to the external air through an opening 6a in the rear wall, and is further opened to the intake side of a blower 18 via an external air intake passage 13 formed by a partition wall 12. Internal air intake ports 14, 14 are formed on both the right and left sides of a front wall 10b. The internal air intake ports 14, 14 are opened to the intake side of the blower 18 via an internal air intake passage 15. The external air intake passage 13 and the internal air intake passage 15 are equipped with a filter 16 for the external air and a filter 17 for the internal air. The blow side of the blower 18 is opened in the housing 20 which contains the heating means and the cooling means.

The housing 20 which contains the cooling means and the heating means is provided with a cooling coil 21 that works as the cooling means and a heating coil 22 that works as the heating means. The internal air and the external air from the blower 18 are sent to an outlet port 23 via the cooling coil 21, or are sent to the heating coil 22. The internal air and the external air that have passed through the heating coil 22 are sent to a blow port 24. A temperature adjusting damper 25 is provided between the outlet port 23 and the heating coil 22. The cooling coil 21 is connected to a cooler which is not shown via conduits 26, and the heating coil 22 is connected to a heater which is not shown via conduits 27.

An inlet port 31 is formed in a side wall 30a of the housing 30 for mixing the air, the inlet port 31 being communicated with the blow port 24. Blow ports 32, 32 for feet are formed on the upper right and left sides of the front wall 30b. An outlet port 33 is formed in a bottom wall 30c, the outlet port 33 being communicated with a defroster blow port 37 and a front blow port 38 in the dash board, via a blow duct 34 under the floor and a blow duct 35.

If the housing 10 for intaking the internal air and the external air and the housing 30 for mixing the air, are removed, it is allowed to check and service the units located under the floor board 7. Therefore, there is no need of removing the housing 20 containing the cooling means and the heating means to which the conduits 26, 27 are connected, and the checking and servicing can be easily carried out.

Since the individual units are all provided in the cabin 1, it is easy to check and service them, and to clean the filters.

Further, the housing 30 for mixing the air of a large capacity is provided under the operator's seat 40, and the air is efficiently and sufficiently mixed therein and is then blown. Therefore, the temperature of the blowing air can be uniformalized to uniformly cool or heat the air in the cabin 1.

Further, since the internal air intake ports 14 are provided on the right and left sides in the rear portion of the cabin 1, the air can be intaken from both the right and left sides in the cabin 1 to uniformalize the flow of air in the cabin 1. Further, the air which is blown is prevented from being directly intaken.

Moreover, since the cold air or the hot air is blown from the blow ports 32, 32 near the feet, from the front blow port 38, and from the defroster blow port 37, the air in the cabin 1 can be efficiently cooled or heated, while effectively producing the defrosting function (to prevent the front windowpane from being clouded).

By manipulating the temperature adjusting damper 25, furthermore, the temperature of the cold air or the hot air can be adjusted to suit for the operator's demand.

The external air intake port 11 can be changed by changing the housing 10 for intaking the internal air and the external air. Therefore, the direction for intaking the external air can be freely selected.

According to the air conditioning device of the present invention, checking and servicing can be easily carried out such as cleaning the filters. Further, by simply removing the housing 10 for intaking the internal air and the external air and removing the housing 30 for mixing the air, it is allowed to service the units under the floor. Therefore, good serviceability is maintained, and comfortableness of being in the cabin is not deteriorated.

Further, the air in the cabin is intaken from both the right and left sides at the back of the operator's seat, and the cold air or the hot air is blown from the dash board installed in the front portion in the cabin 1. Therefore, the air stream is established flowing from the front toward the rear in the cabin 1. Namely, the air stream flows uniformly in the cabin 1, the cold air or the hot air which is blown is not directly intaken, and the air in the cabin 1 can be efficiently cooled or heated.

What is claimed is:

1. In an air conditioning device installed in a cabin of an earth-moving vehicle, said cabin having an operator's seat and a dashboard, said air conditioning device comprising air cooling means, air heating means, and a blower having intake and outlet sides for blowing internal air and external air to intake sides of said cooling means or said heating means, the improvement wherein internal air intake means communicating with said intake side of said blower are formed on both the right and left sides in the cabin at the back of said operator's seat; blower means are formed in said dashboard positioned in front in said cabin to blow cold air or hot air supplied from said cooling means or said heating means;

a first housing for intaking internal air and external air is located at the back of said operator's seat, said housing enclosing said internal air intake means, said external air intake means, filter means for internal air and external air, and said blower; a second housing is located by one side of said operator's seat containing said air cooling means and said air heating means; and a third housing for mixing air is located under said operator's seat containing blower means for blowing said cold air or said hot air; wherein said outlet side of said blower is opened into said second housing so as to communicate with said air cooling means and said air heating means, and outlet sides of said cooling means and said heating means are opened into said third housing so as to communicate therewith.

* * * * *